Oct. 25, 1966    S. GRZYMISLANWSKI    3,280,676
APPARATUS FOR CUTTING GLASS
Filed July 23, 1965      2 Sheets-Sheet 1
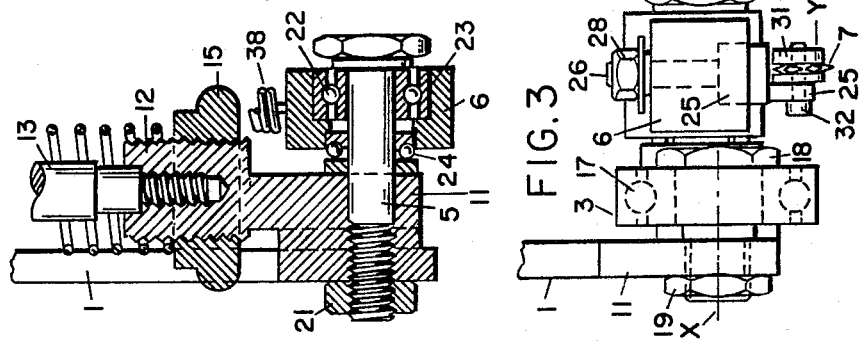
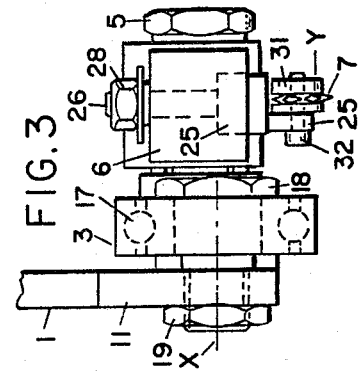
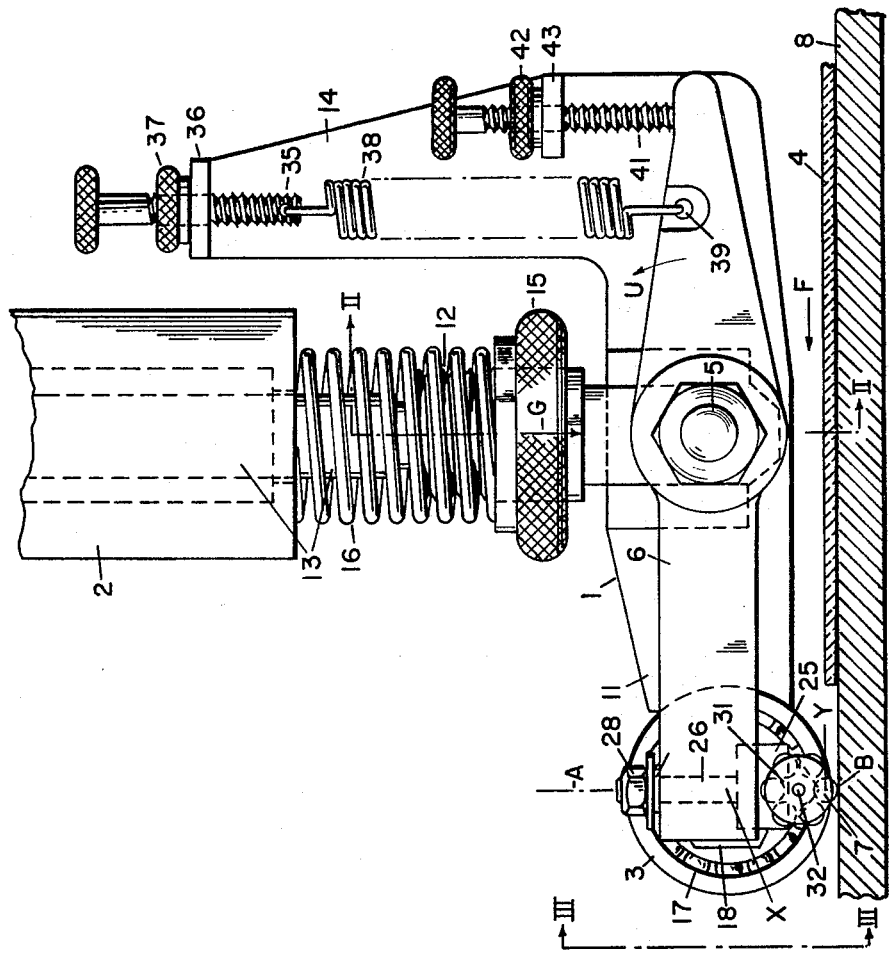
STANISLAS GRZYMISLANWSKI
*INVENTOR.*
BY *Karl F. Ross*
*Attorney*

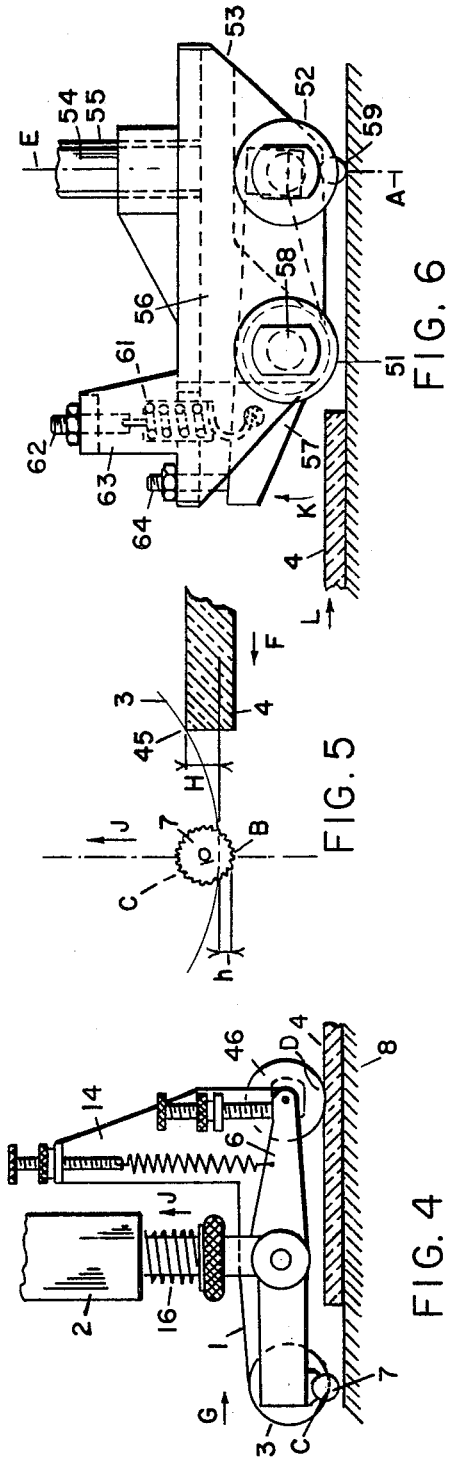
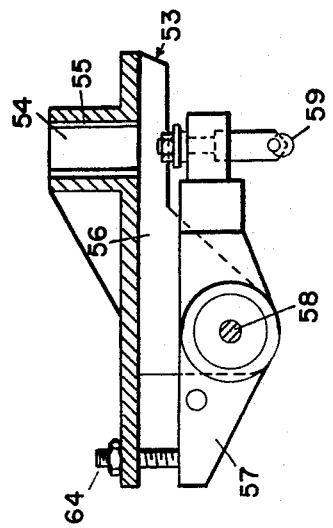
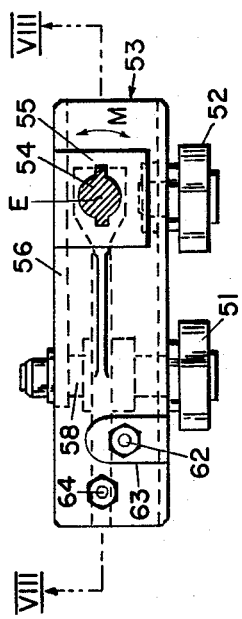
STANISLAS GRZYMISLANWSKI
*INVENTOR.*
BY Karl F. Ross
*Attorney*

United States Patent Office 3,280,676
Patented Oct. 25, 1966

3,280,676
APPARATUS FOR CUTTING GLASS
Stanislas Grzymislawski, Aniche, France, assignor to Glaces de Boussois, Paris, France, a corporation of France
Filed July 23, 1965, Ser. No. 474,299
Claims priority, application France, July 27, 1964, 983,101
15 Claims. (Cl. 83—8)

My present invention relates to an apparatus for cutting sheets of glass or similar material.

For the cutting of glass sheets and the like it is customary to employ a knurled wheel, or rowel, urged under pressure against the sheet surface so as to penetrate it to a fraction of its thickness. When this is done automatically, i.e. when the cutting implement is mounted on a holder suspended above the sheet for horizontal motion relative thereto while being urged downwardly toward the sheet by a weight, a spring or some other biasing force, irregularities in the sheet surface will lead to changes in the depth of penetration so that upwardly curved sheet portions will be cut more deeply than flat or depressed portions. Since a clean fracture requires that the glass be scored uniformly to a predetermined depth, e.g. of several tenths of a millimeter, the invention has as one of its objects the provision of means for avoiding this kind of irregularity.

Cutting implements of the type described are usually made of tungsten carbide or similar refractory, relatively brittle materials. If the rowel initially rests on the sheet-supporting surface, it must be lifted therefrom by the oncoming sheet edge and, for this purpose, must have a radius greater than the thickness of the sheet. Even so, the impact between the sheet edge and the rowel may be paired. A further object of my invention, therefore, is blunt or nick the latter so that its cutting action is impaired. A further object of my invention, therefore, is to provide means for minimizing this impact and, at the same time, permitting the use of smaller rowels whose radius is independent of the sheet thickness.

The foregoing objects are realized, in accordance with my present invention, by the provision of a two-part holder for the cutting implement, this holder comprising a spring-loaded or otherwise downwardly biased shoe and a swingable arm pivotally secured thereto. The shoe, guided with freedom of generally vertical displacement in a support which is generally horizontally displaceable with reference to the sheet to be cut, carries a sheet-contacting roller adjacent an extremity of the swingable arm on which the cutting implement is mounted so as to project downwardly beyond the nadir of the roller to the desired depth of penetration; a yieldable linkage so interconnects the shoe and the arm that the cutting implement is normally maintained at its predetermined level below the roller while being able to move upwardly, with reference to the roller, upon encountering, say, a localized rise in the sheet surface. Such a yieldable linkage includes, advantageously, one or more springs tending to swing the aforementioned extremity downwardly and an adjustable stop limiting this downward swing. The roller, whose radius substantially exceeds the sheet thickness, is cammed upwardly by the oncoming leading edge of the sheet and thereby raises the cutting implement to its proper operating level before the implement contacts the sheet. The support for the implement holder may be either stationary or movable since, of course, the relative displacement between the implement and the sheet may be brought about by motion of either one or the other, or both. In any event, there will exist two substantially parallel, generally horizontal axes transverse to the direction of this relative displacement, i.e. a first axis about which the arm swings on the shoe and a second axis about which the roller is rotatable. The cutting implement, if designed as a rowel, turns about a third axis which preferably is vertically aligned with the aforementioned second axis so that rowel and roller share a common vertical radial plane.

In some instances it will be desirable to provide, on the shoe, a second roller rotatable about an axis horizontally offset from that of the first roller, specifically at a location forwardly of the first roller as viewed from the direction of the oncoming sheet. This second roller, whose diameter may be about equal to that of the first roller and should also be substantially greater than that of the cutting rowel, then makes the first contact with the sheet to be cut and, by the aforedescribed camming action, raises the trailing cutting implement off the supporting surface; with this arrangement, therefore, the implement holder can be freely moved across that surface once the leading roller had engaged the sheet. According to a further feature of my invention, this leading roller is slightly raised above the trailing roller alongside the cutting implement, by a distance which should be less than the sheet thickness and may equal about half that thickness so that the camming displacement of the implement is more or less equally distributed between the two rollers.

The above and other features of my invention will become more fully apparent from the following detailed description of certain embodiments, reference being made to the accompanying drawing in which:

FIG. 1 is a side-elevational view of an apparatus embodying the invention;

FIG. 2 is a fragmentary sectional view taken on the line II—II of FIG. 1;

FIG. 3 is a fragmentary end view taken on the line III—III of FIG. 1;

FIG. 4 is a side-elevational view similar to FIG. 1, illustrating a modification;

FIG. 5 is an explanatory diagram;

FIG. 6 is a side-elevational view of a further embodiment of my invention;

FIG. 7 is a top plan view of the apparatus shown in FIG. 6; and

FIG. 8 is a sectional view taken on the line VIII—VIII of FIG. 7.

The apparatus shown in FIGS. 1 to 3 comprises a shoe 1 mounted, with freedom of at least limited vertical displacement, on an overhead support 2 which may be part of a horizontally movable carriage or may be fixed to the machine frame, the latter also including a table 8 supporting a glass sheet 4 to be cut.

Shoe 1 forms part of an implement holder which further comprises a swingable arm 6 pivotally mounted on a horizontal leg 11 of the shoe by means of a bolt 5 fastened to the leg with the aid of a nut 21. The left-hand extremity (as viewed in FIG. 1) of leg 11 has journaled thereon a roller 3 of a radius substantially greater than the thickness of sheet 4. This roller constitutes the outer race of a ball bearing 17 whose inner race is rigid with a mounting bolt 18 fastened to the leg 11 by a nut 19.

Alongside roller 3, on a corresponding extremity of arm 6, a block 25 rigid with an upstanding threaded stem 26 is introduced from below into a complementary recess of the arm and is held in position by a nut 28 engaging the stem 26 with interposition of one or more washers 29 between this nut and the arm. A lug 25′ projects downwardly from the block 25 and is traversed by a mounting bolt 32 engaging a rotatable disk 31 which in turn carries an array of small cutter wheels or rowels 7, the lowermost one of these rowels projecting downwardly below the nadir of roller 3 by a distance $h$ (see FIG. 5) equalling a small fraction of the thickness $H$ of sheet 4. It will be noted that each rowel 7 has a diameter which is considerably smaller than that of the roller 3 and, in the arrangement illustrated, is roughly equal to the sheet thickness H. Upon a loosening of bolt 32, any one of the several rowels 7 may be operatively positioned in line with the nadir C of roller 3; in this operative position, the lowest point B of the rowel lies in a vertical radial plane A thereof which also radially passes through the nadir C of the roller; the horizontal axes of rotation X of the roller and Y of the rowel lie in this plane A.

The connection between shoe 1 and support 2 includes an internally and externally threaded socket 12, rigid with leg 11, which has screwed into it an upstanding stem 13 slidably received in a vertical bore of support 2. An expanding coil spring 16 partly surrounds the stem 13 and bears upon the support 2 as well as upon a milled nut 15 engaging the threaded outer surface of socket 12. Thus, spring 16 urges the shoe 1 downwardly as indicated by the arrow G in FIG. 1.

The extremity of shoe 1 opposite the one bearing the roller 3 is formed as an upstanding leg 14 with a transverse shelf 36 into which a bolt 35 is threaded, this bolt being fixed in position by a milled counternut 37. Another contractile coil spring 38 is anchored to the lower end of bolt 35 and engages the arm 6 at 39, thereby tending to swing this arm counterclockwise (FIG. 1) as indicated by arrow U. The extent of this swinging motion is limited by a bolt 41 threadedly engaging another transverse shelf 43 of leg 14 and locked in position by a milled counternut 42, the lower end of this bolt bearing upon the free end of arm 6 opposite the extremity which carries the array of cutting implements 7. It will be apparent that adjustment of bolt 41 permits a change in the level of the rowel carrier 31 with reference to roller 3 and, thereby, a variation of the distance $h$ which, usually, has a value of a few tenths of a millimeter.

To facilitate the swinging of arm 6 relative to shoe 1, a ball-type thrust bearing 24 is interposed between this arm and the leg 11.

In the description of the operation of the apparatus of FIGS. 1–3 it will be assumed that support 2 is stationary and that the sheet 4 is being slid, in the direction of arrow F, across the table 8 toward the cutting assembly 3, 7 which initially rests fixedly on the table under the urging of biasing spring 16.

As the sheet 4 approaches the roller 3, its leading edge 45 (FIG. 5) engages the roller periphery so as to cam the assembly 3, 7 upwardly (arrow J) until the nadir C of the roller lies almost at the level of the upper sheet surface. At this instant, the rowel 7 begins to cut into the sheet whose edge 45 strikes the rowel at a rather small angle so as to avoid any damage to the implement. Since the roller 3 will follow any rise and fall of the sheet surface, the rowel 7 will be entrained so as to maintain a constant depth of penetration equal to the distance $h$.

Naturally, rowel 7 may yield upwardly against the restraining force of the resilient link 38, suitably adjusted by the bolt 35, if any obstacle should present itself in its path.

As illustrated in FIG. 4, a second roller 46 may be journaled on arm 6 forwardly of the roller 3, thus at a location closer to the oncoming sheet 4, the nadir D of this roller 46 being advantageously raised above nadir C of roller 3 with a difference in height somewhat greater than $h$ but substantially less than H, e.g. equal to $H/2$. With this arrangement, the oncoming sheet edge 45 will first meet the roller 46 and cam the implement holder 1, 6 upwardly by a distance $H/2$, this action being followed by a like camming action upon the subsequent encounter between edge 45 and roller 3. With this arrangement it is also possible to start the operation by lowering the holder 1, 6 into the position illustrated in FIG. 4, in which the roller 46 already rests on the sheet 4, and thereafter to displace the support 2 with the holder in the direction opposite that of arrow F, as indicated by arrow G in FIG. 4, to bring the cutting assembly 3, 7 into engagement with the sheet; this is true because the roller 46, in riding on the sheet 4, lifts the lowermost rowel 7 off the table 8 so that no undesirable contact between the rowel and the table would take place during such motion.

In FIGS. 6–8 I have shown part of a modified apparatus whose implement holder again consists essentially of two relatively movable members, i.e. a shoe 53 and a swingable arm 57 pivotally secured to a horizontal leg 56 of the shoe by a bolt 58. The yieldable linkage interconnecting the two members is here represented by a contractile spring 61 anchored via a bolt 62 to a bracket 63 of shoe 53 and also attached to the left-hand extremity of arm 57 which is urged by the spring (in a clockwise direction indicated in FIG. 6 by arrow K) against an adjustable stop screw 64. The other end of shoe 53 is formed with an upstanding stem 54 slidably received, as before, in an overhead support not illustrated and weighted down by a suitable biasing force; stem 54 is formed with ribs 55 preventing relative rotation between the holder 53, 57 and its support, this holder being thus bodily swingable about the axis E of stem 54 by rotation of the support and the stem in a horizontal plane as indicated by the arrow M in FIG. 7. Axis E passes through the cutting point of an implement 59 which may be similar to the bottom rowel 7 of FIGS. 1 and 3, this axis E being thus included in the aforedescribed common radial plane A of the rowel and of its associated guide roller 52. Another guide roller 51 is journaled on the bolt 58 so as to be rotatable about the swing axis of arm 57; this leading roller 51 is again slightly elevated, e.g. by about half the thickness of sheet 4, above the trailing roller 52 so that the assembly 53, 57 is again cammed upwardly in two stages as the sheet 4 is moved toward the implement 59 as indicated by arrow L in FIG. 6.

The leg 56 of shoe 53 is of inverted-U profile and accommodates the implement 59 between the arms of the U in line with vertical axis E, this arrangement facilitating changes in the direction of cut by a swinging of the implement holder about axis E (arrow M). Thus, the apparatus of FIGS. 6–8 is capable of tracing not only rectilinear but also arcuate or wavy lines.

The diameter of any of the guide rollers 3, 46, 51, 52 may be on the order of half a centimeter; in such case a relative displacement between the sheet 4 and the apparatus at a rate of, say, 60 meters per minute will correspond to a roller speed of about 4,000 r.p.m.

The embodiments specifically described and illustrated may, of course, be further modified without departing from the spirit and scope of my invention as defined in the appended claims.

I claim:

1. An apparatus for cutting sheet glass, comprising a support mounted for generally horizontal motion relative to a sheet to be cut; a shoe depending from said support above the path of said sheet with freedom of relative displacement in a generally vertical direction; biasing means urging said shoe downwardly with reference to said support; an arm pivotally secured to said shoe for relative swinging about a generally horizontal first axis substantially transverse to the direction of said relative displacement; a sheet-contacting roller of a radius substantially exceeding the sheet thickness journaled to said shoe adjacent an extremity of said arm for rotation about a second axis substantially parallel to said first axis; a downwardly pointing cutting implement on said extremity; and yieldable link means interconnecting said arm and said shoe for tending to maintain said implement at a predetermined level below the nadir of said roller.

2. An apparatus as defined in claim 1 wherein said yieldable link means includes an adjustable stop means limiting the downward swing of said extremity and spring means tending to maintain said arm in a limiting position defined by said stop means.

3. An apparatus as defined in claim 1 wherein said cutting implement is a rowel of a diameter substantially less than that of said roller sharing a common vertical radial plane with said roller, said plane including said second axis.

4. An apparatus as defined in claim 1 wherein said shoe is provided with an upstanding stem slidably guided in said support.

5. An apparatus as defined in claim 4 wherein said stem has a centerline substantially intersecting said first axis, said arm and said shoe being provided with extensions beyond said stem interconnected by said link means at a location opposite said extremity.

6. An apparatus as defined in claim 1 wherein said shoe is mounted on said support for rotation about a generally vertical axis in line with the lowest point of said implement.

7. An apparatus as defined in claim 6 wherein said shoe is formed with an inverted-U profile straddling said arm and said implement.

8. An apparatus for cutting sheet glass, comprising a support mounted for generally horizontal motion relative to a sheet to be cut; a shoe depending from said support above the path of said sheet with freedom of relative displacement in a generally vertical direction; biasing means urging said shoe downwardly with reference to said support; an arm pivotally secured to said shoe for relative swinging about a generally horizontal first axis substantially transverse to the direction of said relative displacement; a first sheet-contacting roller of a radius substantially exceeding the sheet thickness journaled to said shoe adjacent an extremity of said arm for rotation about a second axis substantially parallel to said first axis; a downwardly pointing cutting implement on said extremity; a second sheet-contacting roller of a radius substantially exceeding the sheet thickness journaled to said shoe at a location offset from said cutting implement for rotation about an axis substantially parallel to said second axis; and yieldable link means interconnecting said arm and said shoe for tending to maintain said implement at a predetermined level below the nadir of said first roller.

9. An apparatus as defined in claim 8 wherein said second roller precedes said first roller as viewed from the direction of the oncoming sheet.

10. An apparatus as defined in claim 9 wherein said second roller is elevated above said first roller by a distance less than $H-h$ where H is the sheet thickness and $h$ is the difference between the levels of the lowest point of said implement and the nadir of said first roller, $h$ being substantially smaller than H.

11. An apparatus as defined in claim 10 wherein said distance is substantially equal to $H/2$.

12. An apparatus as defined in claim 10 wherein said rollers are disposed on opposite sides of said first axis.

13. An apparatus as defined in claim 10 wherein said second roller is rotatable about said first axis.

14. An apparatus as defined in claim 13 wherein said shoe is provided with an upstanding stem slidably guided in said support, said stem having a centerline intersecting said second axis.

15. An apparatus as defined in claim 14 wherein said shoe is rotatable about said centerline, the latter being aligned with the lowest point of said implement.

References Cited by the Examiner

UNITED STATES PATENTS 2,948,991  8/1960  Walters et al. _____ 225—96.5

FOREIGN PATENTS 1,338,988  8/1963  France.

WILLIAM W. DYER, Jr., *Primary Examiner.*

J. M. MEISTER, *Assistant Examiner.*